United States Patent [19]

Wells

[11] Patent Number: 5,096,093
[45] Date of Patent: Mar. 17, 1992

[54] HAND HELD HYDRAULIC DISPENSER

[76] Inventor: John R. Wells, 5005 Crockett, Galveston, Tex. 77550

[21] Appl. No.: 139,952

[22] Filed: Dec. 31, 1987

Related U.S. Application Data

[63] Continuation of Ser. No. 722,429, Apr. 12, 1985, abandoned.

[51] Int. Cl.$^5$ .............................................. B65D 35/28
[52] U.S. Cl. .................................. 222/95; 73/864.62
[58] Field of Search ............... 222/105, 334, 335, 372, 222/373, 204, 416, 95, 214, 215, 386.5, 389, 394, 107, 395; 141/114, 1, 10, 98, 313-317, 100; 604/131, 132, 133; 73/864.62, 864.34, 864.35

[56] References Cited

U.S. PATENT DOCUMENTS

| | | | |
|---|---|---|---|
| 3,032,037 | 5/1962 | Huber | 604/133 |
| 3,153,414 | 10/1964 | Beall et al. | 222/95 |
| 3,199,511 | 8/1965 | Kulick | 222/95 |
| 3,391,829 | 7/1968 | Gregory | 222/95 |
| 4,008,831 | 2/1977 | Vidilles | 222/95 |
| 4,147,278 | 4/1979 | Uhlig | 222/94 |

Primary Examiner—Robert P. Olszewski
Assistant Examiner—Kenneth Noland
Attorney, Agent, or Firm—Donald G. Lewis

[57] ABSTRACT

The invention is a hand held hydraulic dispenser and a manual method for hydraulically dispensing sample liquids. The hydraulic dispenser acts as a hydraulic press to dispense sample liquids from a magazine which holds the sample liquid. The hydraulic dispenser includes a hydraulic pump and a magazine coupler which are hydraulically connected by a hydraulic hose. A handle portion is incorporated into the magazine coupler to enable the user to support and manipulate the magazine coupler while pipetting liquids. The user first attaches the magazine to the magazine coupler. The user then activates the hydraulic pump in order to generate quantitative positive displacements of hydraulic liquid. These positive displacements of hydraulic liquid are transmitted to the magazine coupler, which, in turn, responds by expanding and collapsing the magazine attached thereto. As a result, sample liquid is aspirated and expressed from the device. The expression of sample fluid from the device is quantitative. The invention combines the principle of the hydraulic press with the concept of an insertable magazine. The dispensing portion of the device may be hand held and manipulated by the user for accessing variously located sample liquids.

7 Claims, 4 Drawing Sheets

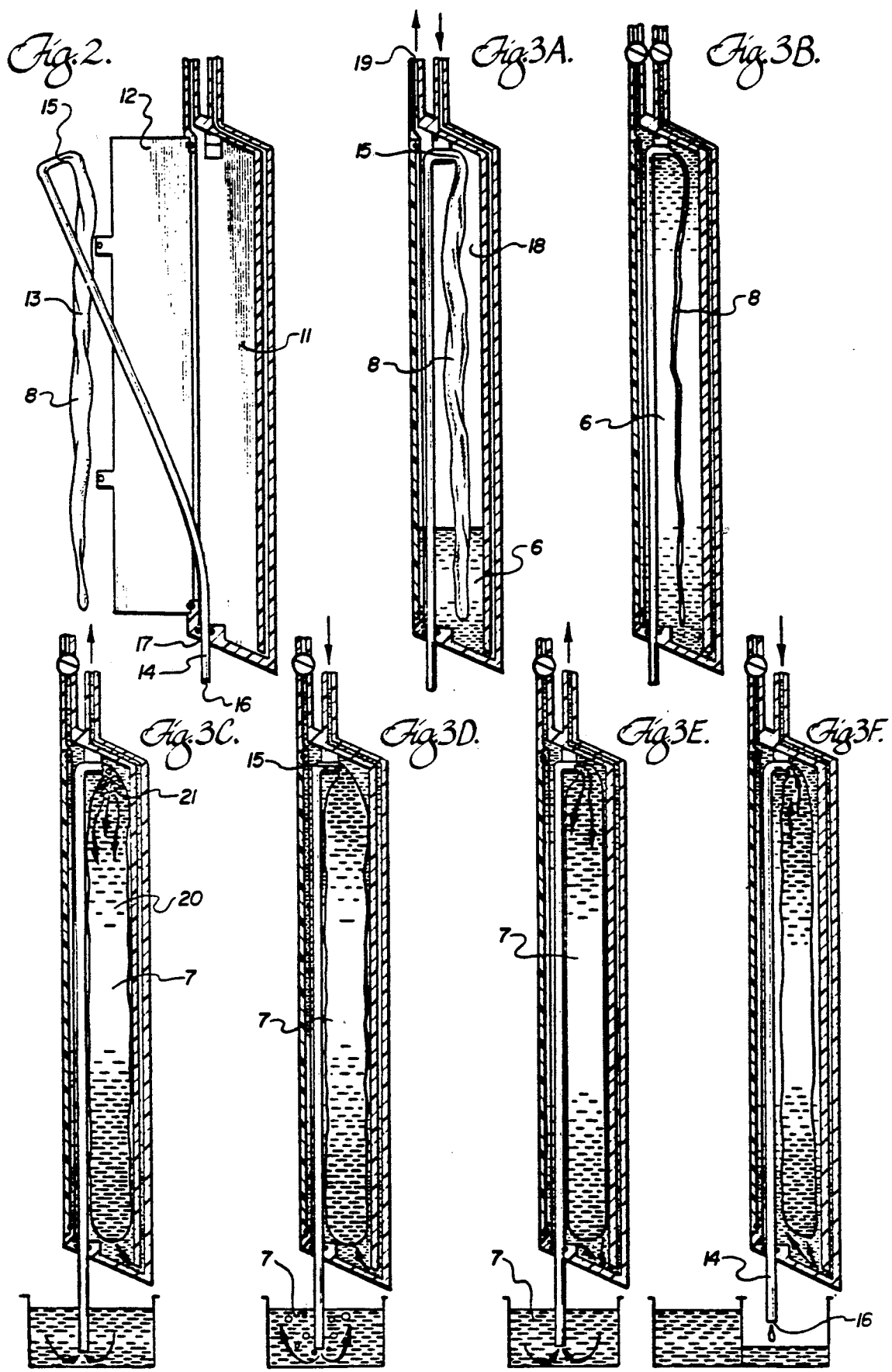

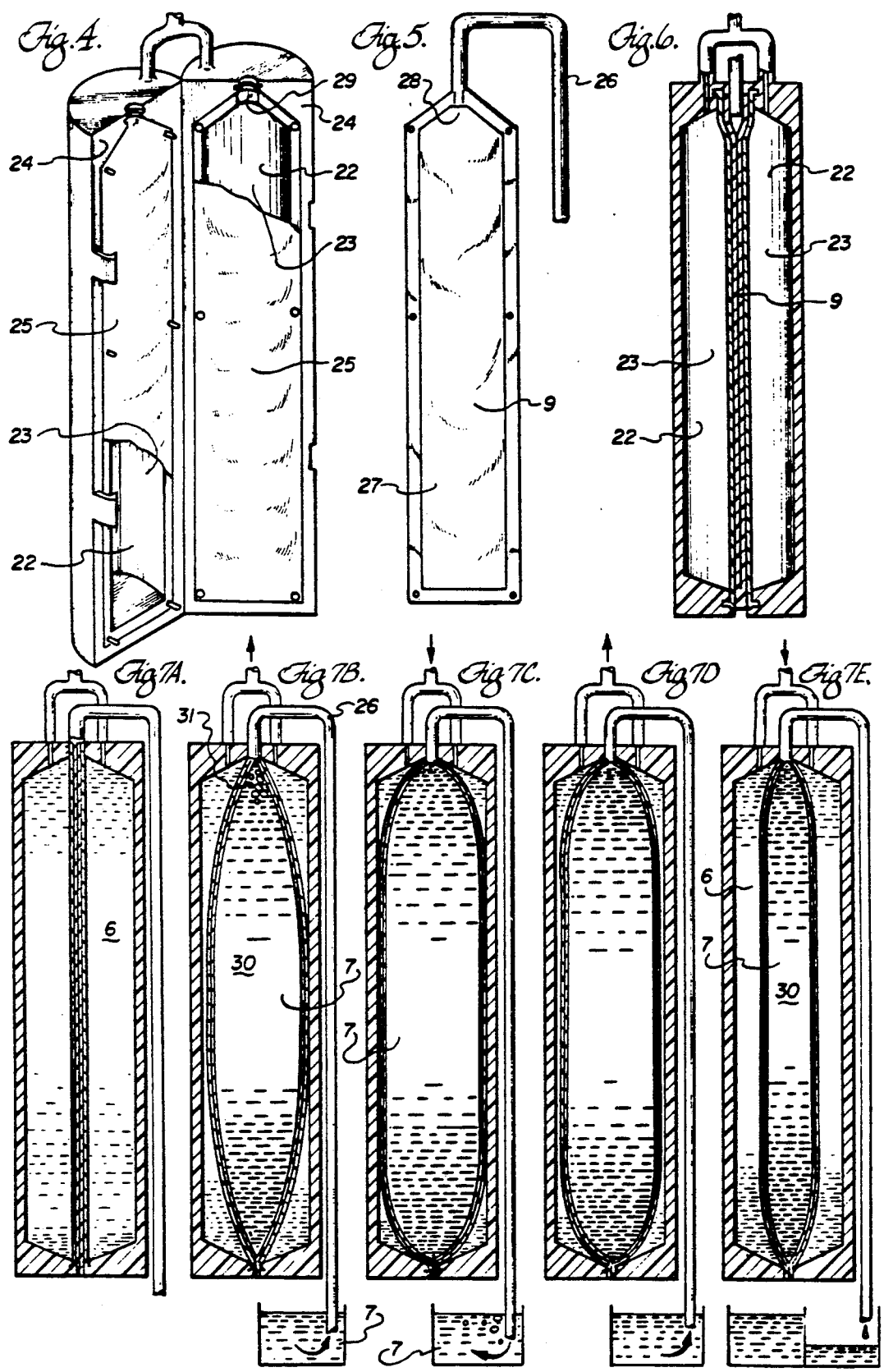

HAND HELD HYDRAULIC DISPENSER

This is a continuation-in-part of copending application Ser. No. 722,429 filed on Apr. 12, 1985, now abandoned.

BACKGROUND OF THE INVENTION

The invention relates to the field of liquid handling. More specifically, the invention relates to dispensing devices which dispense sample liquid from a magazine which is inserted into the device and which include a hydraulic pump for collapsing the inserted magazine and dispensing sample liquid therefrom.

For many liquid handling applications both quantitative accuracy and cleanliness are required. The invention is a hydraulic dispenser which includes and combines the means to impart both quantitative accuracy and cleanliness. Quantitative accuracy is provided by the use of a hydraulic press and a hydraulic pump; cleanliness is provided by the use of an insertable magazine for containing the sample liquid. During operation, the insertable magazine is attached to and hydraulically coupled to the hydraulic press. The hydraulic pump within the hydraulic press acts on the coupled magazine in order to dispense sample liquid by means of quantitative positive hydraulic displacement.

The hydraulic press houses hydraulic liquid and includes the means to generate both quantitative positive displacements and reflux displacements of the enclosed hydraulic liquid. The hydraulic press includes a hydraulic pump and a magazine coupler hydraulically connected to one an other by means of a hydraulic hose. The hydraulic hose imparts mobility to the magazine coupler. A handle portion is incorporated onto the magazine coupler to enable the user to pickup and support the device when pipetting sample liquids. When the insertable magazine and the magazine coupler are connected, the magazine coupler relays hydraulic displacements from the hydraulic pump to the magazine. Hydraulic displacements generated by the pump are relayed through the coupler to the magazine to cause the magazine to expand or to collapse. The magazine can be loaded with sample liquid either prior to insertion or after insertion. Reflux displacements generated by the pump cause an inserted magazine to expand and thereby to aspirate sample liquid; positive displacements generated by the pump cause the magazine to collapse and thereby to express sample liquid. The insertion and connection of a preloaded magazine without entrapped air establishes immediate hydraulic contact with the pump. If a magazine is loaded after insertion, hydraulic contact is established after the entrapped air is purged. The accuracy of dispensing for this invention depends on the accuracy of the quantitative positive displacements generated by the hydraulic pump and upon the establishment of hydraulic contact between the hydraulic pump and the sample liquid contained within the magazine. The accuracy of dispensing for this invention does not depend upon the accuracy of the reflux displacements.

Dispensers utilizing a hydraulic pump hydraulically coupled to a supply chamber for dispensing liquid from the supply chamber are known. Examples of the use of a hydraulic pump for dispensing liquids are illustrated in U.S. Pat. No. 3,572,552 (Guinn) and U.S. Pat. No. 4,158,035 (Haase). In each of these devices, the supply chamber is an integral and permanent part of the device. Neither of these devices includes the means to couple to an insertable magazine. Although these devices teach how to establish hydraulic contact between the pump and the diaphragm of the supply chamber, the devices do not teach how to establish hydraulic contact between the pump and the sample liquid enclosed by the supply chamber. The accuracy of these devices depends upon the accuracy of both the reflux displacement and the positive displacement, neither of which is hydraulically coupled to the sample liquid. These devices are not capable of positive hydraulic displacement of the sample liquid.

Positive displacement and reflux displacement should be distinguished. A positive displacement results from the assertion of an affirmative force. If the force underlying a positive displacement is sufficient, it will overwhelm any resistive properties of the sample liquid such as viscosity, surface tension, density, and vapor pressure and any extrinsic forces such as atmospheric pressure or gravity. A reflux displacement results from the force of atmospheric pressure when a pre-existing restraining force is removed. The accuracy of a reflux displacement is limited by the presence of resistive forces which may exceed the forces due to atmospheric pressure.

Positive hydraulic displacement should be distinguished from positive displacement. A positive hydraulic displacement results from the action of a positive force upon a train of mechanical parts and incompressible liquids contained in a rigid container. An initial positive force applied at one end is undissipated by the train. The train is not hydraulic if it includes a compressible component. When a positive force is applied at one end of a compressible train, the train will compress until its compression pressure matches the sum of all opposing resistive pressures. The effect is to dissipate the initial applied force. The displacement force at the far end of a compressible train is less than the initial applied force. Because the Guinn and Haase devices each allow air to be entrapped within their supply chambers, these devices can not be considered to be positive hydraulic displacement devices. All air must be purged from a hydraulic system for the system to be incompressible. Neither the Guinn device nor the Haase device illustrates how to establish hydraulic contact between the pump and the sample liquid.

An example of a device utilizing positive hydraulic displacement is illustrated in U.S. Pat. No. 2,529,937 (Hale). The Hale device hydraulically couples a displacement liquid with the sample liquid for controlling and metering the flow rate of the sample liquid. The Hale device does not include means for dispensing individual aliquots of the sample liquid or for aspirating sample liquid into the sample chamber. The Hale device does not include a pump or its equivalent which can generate quantitative displacements of the hydraulic liquid. The Hale device is useful for the continuous application of sample liquid at a measured flow rate.

An example of an other device utilizing positive hydraulic displacement is illustrated in U.S. Pat. No. 3,121,614 (Galster). The Galster device is a titration device which dispenses serial aliquots of identical volumes of standard solution into a test solution. The Galster patent illustrates how to hydraulically couple a pressure liquid with a titrating liquid for dispensing the titrating liquid. However, the Galster patent does not teach the concept of positive hydraulic displacement. Also, the Galster device does not include means to couple an insertable magazine to the pump. The sample chamber of the Galster device must be cleaned by flushing between uses of different titrating liquids.

Dispensers which utilize disposable magazines are known and widely used. The use of a disposable magazine improves the cleanliness and convenience of liquid handling. Disposable magazines are particularly useful for handling corrosive, radio active, and other toxic liquids.

An example of a dispensing device which combines the use of an insertable magazine with a hydraulic pump is illustrated in U.S. Pat. No. 3,736,099 (Begg). The Begg device is a convenient dispensing device because it combines some of the advantages of a hydraulic pump with the convenience of the insertable magazine. However, the Begg device does not include the means to establish hydraulic contact between the pump and the sample liquid. The Begg patent does not teach how to purge entrapped air from the inserted magazine; the Begg device does not teach how to insert and to connect a preloaded magazine to the dispensing device.

SUMMARY OF THE INVENTION

The invention is a hydraulic dispenser and a method for dispensing sample liquids. The hydraulic dispenser is a hydraulic press which includes a hydraulic pump and a magazine coupler hydraulically connected to each other. The hydraulic pump houses hydraulic liquid and generates quantitative positive displacements of the hydraulic liquid contained therein. The magazine coupler includes means to couple to an insertable magazine. The insertable magazine can be inserted into or removed from the magazine coupler of the hydraulic dispenser. The magazine includes an enclosure which serves as a store for the sample liquid. A tubular spout communicating to the enclosure serves as a guide for transferring sample liquid to and from the magazine. The magazine coupler includes means to hydraulically couple to the magazine when it is inserted. The purpose of the magazine coupler is to relay hydraulic displacements between the hydraulic pump and the insertable magazine. When hydraulic contact is established between the hydraulic pump and the sample liquid enclosed within the magazine, the hydraulic dispenser dispenses sample liquid by positive hydraulic displacement.

The hydraulic pump is hydraulically connected to the magazine coupler with hydraulic liquid. The hydraulic pump can generate either positive or reflux displacements of the enclosed hydraulic liquid. Also, the hydraulic pump can generate quantitative positive hydraulic displacements. The magazine coupler includes means to receive the hydraulic displacements from the pump and to relay these displacements to the inserted magazine. The hydraulic pump can be controlled by the user to generate, meter, and transmit a range of quantitative displacements of hydraulic liquid.

To use the hydraulic dispenser, the magazine is inserted into the magazine coupler. The magazine enclosure can expand or collapse in response to displacements generated by the pump and relayed by the magazine coupler. Expanding the magazine enclosure causes sample liquid to aspirate into the enclosure through the tubular spout; collapsing the magazine enclosure causes the content of the enclosure to express through the tubular spout. Loading the magazine with sample liquid and eliminating the enclosed air establishes hydraulic contact between the pump and the sample liquid in the enclosure. Once hydraulic contact is established, the hydraulic dispenser can express sample liquid from the magazine by quantitative positive hydraulic displacement.

In order to establish hydraulic contact between the sample liquid and the hydraulic pump, all entrapped air must be eliminated from the system. Hydraulic contact may be established by inserting a magazine which is loaded with sample liquid and purged of entrapped air prior to insertion. If the magazine is loaded and purged prior to insertion, the spout of the magazine should be stoppered until the hydraulic connection is established. Alternatively, hydraulic contact may be established after inserting an unloaded magazine. If the magazine is loaded and purged after insertion, the elimination of entrapped air from the magazine establishes hydraulic contact.

A purgable magazine is used to facilitate the elimination of entrapped air. A purgable magazine includes an enclosure for containing sample liquid with a spout which exits from the topmost part of the enclosure. Entrapped air floats to the top most part of the enclosure when the dispenser is held in its normally upright position. When the purgable magazine is collapsed, the entrapped air will vent from the magazine prior to the expression of sample liquid. The expression of a stream of sample liquid from the magazine assures that the purging of entrapped air is complete.

The magazine may be a disposable. The magazine coupler is configured to facilitate the insertion and removal of the magazine and its connection to and disconnection from the coupler.

The magazine coupler includes several species. The preferred embodiment of each of three species is described. Each species is optimal for a different application. The three species include an immersion coupler, a diaphragmatic coupler, and a mechanical coupler.

The immersion coupler couples with its magazine by immersing the magazine in hydraulic liquid within a hydraulic chamber. The hydraulic chamber is a rigid chamber for enclosing both the hydraulic liquid and the insertable magazine. The insertable magazine which couples with the immersion coupler is a bag magazine. The bag magazine includes a flexible bag structure which can be inserted and enclosed within the rigid chamber. The flexible bag structure encloses the sample liquid. The flexible bag structure is immersed in the hydraulic liquid after it is inserted into the rigid chamber.

The diaphragmatic coupler is similar to the immersion coupler, except that a diaphragm partitions the rigid chamber to form a hydraulic compartment for containing the hydraulic liquid. The diaphragm partitions the hydraulic fluid from the magazine. The rigid chamber encloses both the hydraulic compartment containing the hydraulic liquid and the magazine containing the sample liquid. The magazine which couples with the diaphragmatic coupler is an envelope magazine. The envelope magazine includes a flexible envelope structure which conforms with the shape of the diaphragm. Hydraulic displacements are transmitted from the hydraulic compartment to the flexible envelope structure within the rigid chamber.

The mechanical coupler includes a coupler piston and coupler cylinder which define a chamber for enclosing the hydraulic liquid. The magazine which couples to the mechanical coupler is a mechanical magazine. The mechanical magazine includes a magazine piston and a magazine cylinder which define an enclosure for containing the sample liquid. When the mechanical magazine is inserted, the coupler piston is mechanically coupled to the magazine piston and the coupler cylinder and the magazine cylinder are each held by the housing in fixed relative positions. Hydraulic displacements are mechanically coupled through the pistons from the hydraulic pump to the sample liquid.

It is a purpose of this invention to manually dispense sample liquid from a magazine by means of quantitative positive hydraulic displacment.

It is a purpose of this invention to manually dispense sample liquid from a purgable magazine by means of quantitative positive hydraulic displacement.

It is a purpose of this invention to manually dispense sample liquid by means of quantitative positive hydraulic displacement from a magazine which can be easily inserted and removed from the dispenser.

It is a purpose of this invention to manually dispense sample liquid from a magazine by means of quantitative positive hydraulic displacement where the means for generating said quantitative positive hydraulic displacement is separate and remote from the magazine and the magazine is hand supported and manipulated.

It is a purpose of this invention to manually dispense sample liquid from a purgable magazine having an enclosure to hold the sample liquid with a short tubular spout which communicates with the topmost part of the enclosure so that collapsing the enclosure causes entrapped air to be eliminated from the enclosure prior to the dispensing of sample liquid and which can be hand manipulated by the user to direct the pipetting of sample liquids.

BRIEF DESCRIPTION OF THE DRAWINGS

FIG. 1 shows the preferred embodiment of each of three species of magazine coupler, viz. an immersion coupler, diaphragmatic coupler, and a mechanical coupler. Inserted into each species of magazine coupler is its corresponding magazine, viz. a bag magazine in the immersion coupler, an envelope magazine in the diaphragmatic coupler, and a mechanical magazine in a mechanical coupler.

FIG. 2 is a sectional view of the immersion coupler illustrated in FIG. 1 shown with the port in the open position and illustrating the insertion of the bag magazine into the rigid chamber and showing a constant volume tubular spout connected to the bag magazine and passing from the rigid chamber through an exit, thereby stopping the exit.

FIGS. 3 (a), (b), (c), (d), (e), and (f) are each sectional views of the immersion coupler illustrated in FIG. 2 shown with an inserted bag magazine illustrating the sequence for using the hydraulic dispenser.

FIG. 3 (a) illustrates the immersion coupler with the bag magazine inserted and the port sealed closed and shows the flooding of the rigid chamber by the positive displacement of hydraulic liquid generated by the hydraulic pump (shown in FIG. 1 and indicated by the arrow pointing inward) and shows the venting of entrapped air from the rigid chamber through the vent (indicated by the arrow pointing outward).

FIG. 3 (b) illustrates the completion of the flooding of the rigid chamber with hydraulic liquid, the completion of the venting of entrapped air from the rigid chamber, and the establishment thereby of hydraulic contact between the hydraulic pump and the flexible bag structure.

FIG. 3 (c) illustrates the reflux of hydraulic liquid from the rigid chamber back into the hydraulic pump (indicated by arrow) and the resultant aspiration of sample liquid into the flexible bag structure.

FIG. 3 (d) illustrates the positive displacement of hydraulic liquid into the rigid chamber which firstly results in the expression of entrapped air from the topmost part of the flexible bag structure and secondly results in the expression of sample liquid from the tubular spout (indicated by arrows), thereby indicating the completion of the purging of entrapped air and the establishment of hydraulic contact between the hydraulic pump and the sample liquid enclosed by the flexible bag structure.

FIG. 3 (e) illustrates the reflux of hydraulic liquid back into the pump which results in the further aspiration of sample liquid into the flexbile bag structure.

FIG. 3 (f) illustrates the quantitative positive displacement of hydraulic liquid into the rigid chamber which the immersion coupler transmits to the sample liquid enclosed in the flexible bag structure resulting in the quantitative expression of sample liquid from the tubular spout of the bag magazine.

FIG. 4 is a view in perspective of the preferred embodiment of the diaphragmatic coupler illustrated in FIG. 1 shown in the open position and illustrating two fragments of the diaphragm partially covering the interior of the rigid chamber.

FIG. 5 is an orthogonal view of an envelope magazine illustrated in FIG. 1 adapted for insertion in the diaphragmatic coupler illustrating a flexible envelope structure connected to a constant volume tubular spout.

FIG. 6 is a sectional view of the diaphragmatic coupler illustrated in FIG. 4 in the closed position with an inserted envelope magazine illustrated in FIG. 5 showing the rigid chamber and the interior of the hydraulic compartment and showing the details of a substantially airless fit between the diaphragm and the flexible envelope structure of the inserted envelope magazine.

FIGS. 7 (a), (b), (c), (d), and (e) are each sectional views of the diaphragmatic coupler illustrated in FIG. 6 shown in the closed position with an inserted envelope magazine having a substantially airless fit with the diaphragm and illustrating the sequence for using the hydraulic dispenser.

FIG. 7 (a) illustrates the hydraulic compartment filled with hydraulic liquid so as to exclude substantially all air from the region between the diaphragm and the flexible envelope structure, thereby establishing hydraulic contact between the hydraulic pump and the flexible envelope structure.

FIG. 7 (b) illustrates the reflux of hydraulic liquid from the hydraulic compartment back into the hydraulic pump and the resultant aspiration of sample liquid into the flexible envelope structure.

FIG. 7 (c) illustrates the positive displacement of hydraulic liquid into the hydraulic compartment which firstly results in the expression of entrapped air from the topmost part of the flexible envelope structure and secondly results in the expression of sample liquid from the tubular spout (indicated by arrows), thereby indicating the completion of the purging of entrapped air and the establishment of hydraulic contact between the hydraulic pump and the sample liquid enclosed by the flexible envelope structure.

FIG. 7 (d) illustrates the reflux of hydraulic liquid back into the pump and further aspiration of sample liquid into the flexible envelope structure.

FIG. 7 (e) illustrates the quantitative positive displacement of hydraulic liquid into the hydraulic compartment. The diaphragmatic coupler transmits the displacement to the flexible envelope structure and the sample liquid enclosed therein, resulting in the quantitative expression of sample liquid from the tubular spout of the envelope magazine.

FIG. 8 shows the piston brace on the coupler piston for attachment to the magazine piston and the housing brace on the magazine housing for attachement to the magazine cylinder.

FIG. 9 shows the magazine cylinder with its cylinder brace receptor; shows the tubular spout connected to the magazine cylinder; and shows a bellows serving to cover the magazine piston to protect against contamination of the mechanical magazine enclosure.

FIG. 10 (a) illustrates the mechanical coupler with an inserted mechanical magazine, the piston brace connecting the coupler piston to the magazine piston and the housing brace connecting the coupler housing to magazine cylinder and thereby fixing the relative positions of the coupler cylinder and the magazine cylinder. FIG. 10 (a) illustrates the coupler chamber filled with hydraulic liquid from the hydraulic pump; and illustrates the magazine enclosure in a collapsed position, thereby illustrating the hydraulic contact between the mechanical coupler and the mechanical magazine.

FIG. 10 (b) illustrates the reflux of hydraulic liquid from the coupler chamber back into the hydraulic pump and the resultant aspiration of sample liquid into the magazine enclosure.

FIG. 10 (c) illustrates the positive displacement of hydraulic liquid into the coupler chamber and the expression of entrapped air from the topmost part of the magazine enclosure and the expression of sample liquid from the magazine enclosure, thereby establishing hydraulic contact between the hydraulic pump and the sample liquid enclosed by the magazine enclosure.

FIG. 10 (d) illustrates the reflux of hydraulic liquid from the coupler chamber back into the pump and further aspiration of sample liquid into the magazine enclosure.

FIG. 10 (e) illustrates the quantitative positive displacement of hydraulic liquid into the coupler chamber. The quantitative positive hydraulic displacement is mechanically transmitted to the sample liquid in the magazine enclosure and results in the quantitative expression of sample liquid from the tubular spout of the mechanical magazine.

DESCRIPTION OF THE PREFERRED EMBODIMENTS

Figure 1:
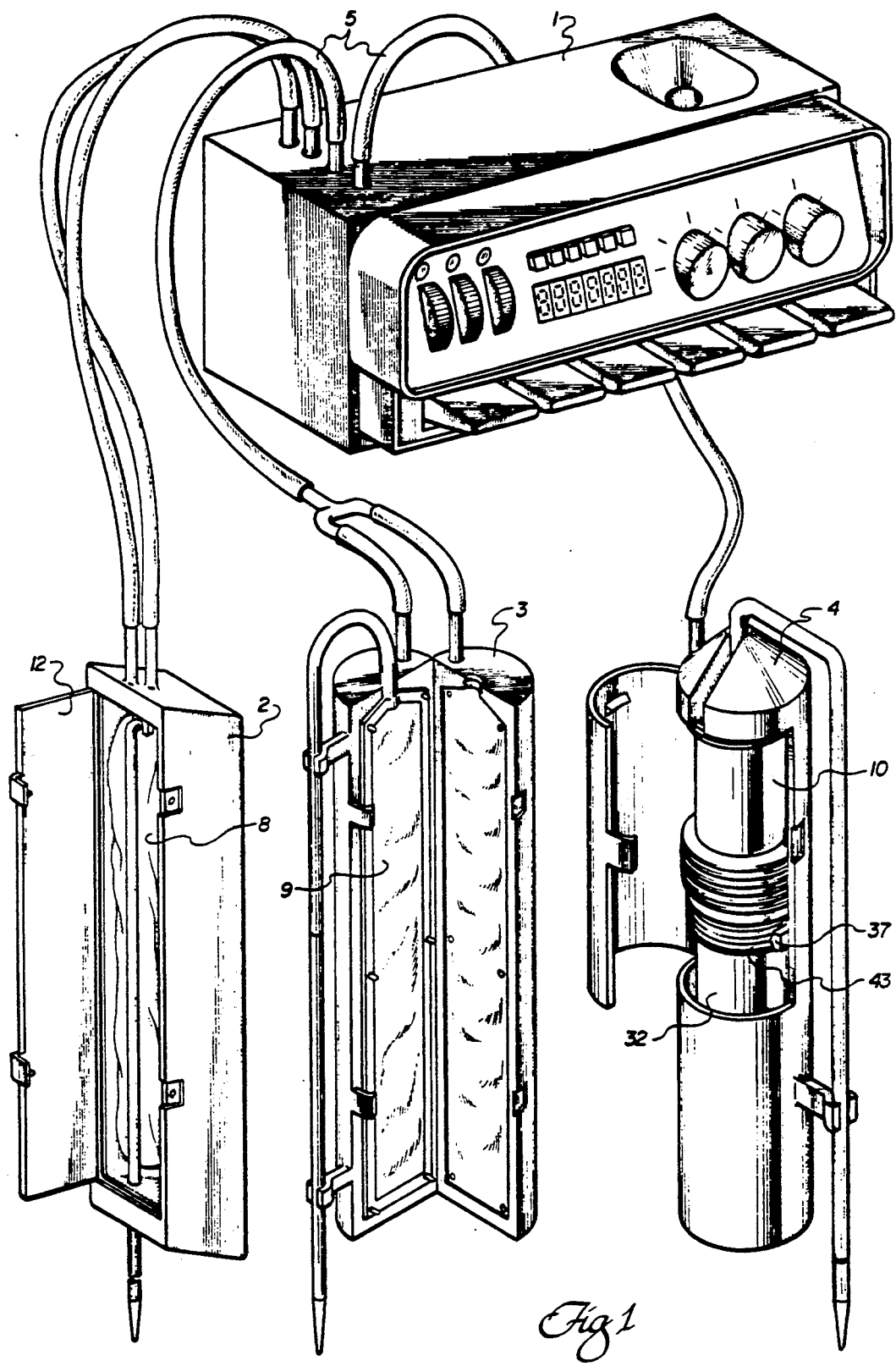
FIG. 1 is a view in perspective of a preferred embodiment of the hydraulic dispenser. The hydraulic dispenser works on the principle of a hydraulic press and includes a hydraulic pump connected by hydraulic hose to magazine couplers.

A preferred embodiment of the hydraulic dispenser is shown in FIG. 1. The hydraulic dispenser works on the principle of the hydraulic press. As a hydraulic press, the hydraulic dispenser includes a hydraulic pump (1) which is hydraulically connected to a magazine coupler. FIG. 1 illustrates a schematic representation of the hydraulic pump (1) and a preferred embodiment of each of three species of the magazine coupler, viz. an immersion coupler (2), a diaphragmatic coupler (3), and a mechanical coupler (4). A preferred embodiment for each type of magazine coupler is shown in the corresponding FIGURES. Each magazine coupler is shown in this preferred embodiment with a housing having a handle portion for manually supporting the magazine coupler and directing the pipetting function of the hydraulic dispenser. The handle portion allows the user to hold the magazine coupler by hand while pipetting or drawing fluids. A hydraulic hose (5) connects the hydraulic pump (1) to one or more of the magazine couplers. The hydraulic hose (5) allows the user to support and manipulate the magazine coupler without also supporting the hydraulic pump (1). Displacements of hydraulic liquid (6) are generated by the hydraulic pump (1) and communicate through the hydraulic hose (5) to the magazine couplers. The magazine couplers couple to magazines. The magazines include an enclosure for storing sample liquid (7). The magazine couplers are actuated by the hydraulic displacements to dispenser sample liquid (7) from the magazine. The magazines can be inserted into or removed from the magazine couplers. FIG. 1 illustrates the magazine couplers in their open position for insertion or removal of the magazines.

Each species of magazine coupler requires a corresponding species of magazine to be adapted to the coupler. A preferred embodiment of each of the three corresponding species of magazine is shown in FIG. 1. A bag magazine (8) is used for the immersion coupler (2); an envelope magazine (9) is used for the diaphragmatic coupler (3); and a mechanical magazine (10) is used for the mechanical coupler (4).

The hydraulic pump (1) can generate both positive hydraulic displacements and reflux displacements. The positive hydraulic displacements force hydraulic liquid (6) through the hydraulic hose (5) and into the magazine coupler. The reflux displacements, draw hydraulic liquid (6) back through the hydraulic hose (5) from the magazine coupler into the hydraulic pump (1). The hydraulic pump (1) can also generate quantitative positive hydraulic displacements for dispensing sample liquid (7) from the inserted magazines.

The distance of separation between the magazine coupler and the hydraulic pump (1) is limited only by the length of the hydraulic hose (5). The location of the hydraulic pump (1) which controls the magazine coupler can be removed from the location where the dispensing actually occurs. The separation of control location from work location can be important for hazardous procedures or sterile procedures which require that the sample liquids be isolated from the operator.

The procedure for inserting or removing the bag magazine (8) into or from the immersion coupler (2) is shown in FIG. 2. The immersion coupler (2) includes a rigid chamber (11) for containing both hydraulic liquid (6) and the bag magazine (8). Before the port (12) of the rigid chamber (11) is opened, the hydraulic liquid (6) is removed from the rigid chamber (11) by refluxing to the hydraulic pump (1) or by discarding. After the port (12) is opened, the bag magazine (8) may be inserted or removed. The bag magazine (8) includes both a flexible bag structure (13) and a tubular spout (14). The tubular spout (14) connects to the topmost part (15) of the flexible bag structure (13). Like the hydraulic hose (5), the tubular spout (14) is adapted to transmit positives hydraulic displacements. If the hydraulic dispenser is to be hand held, the tubular spout (14) is preferably made of a rigid or semi-rigid material which renders the tubular spout (14) substantially inflexible. Additionally, the tip of the tubular spout (14) should extend only proximally from the magazines coupler in order to confer greater manual control as liquids are dispensed or aspirated. In any event, a given tubular spout (14) defines a hollow guide which must maintain a substantially constant carrying volume. When inserting the bag magazine (8) into the rigid chamber (11), the tip of the tubular spout (16) is passed through the port (12) and threaded through the exit (17) of the rigid chamber (11). The passage of the tubular spout (14) through the exit (17) stoppers the exit (17). The flexible bag structure (13) follows the tubular spout (14) through the port (12) and is inserted into the rigid chamber (11). The topmost part (15) maybe secured on a hanger in the rigid chamber.

The sequential procedure for preparing the immersion coupler (2) for use is illustrated as a series in FIGS. 3 (a), (b), (c), (d), (e), and (f). The series in FIG. 3 illustrates the flooding of the rigid chamber (11) with hydraulic liquid (6); the venting of entrapped air from the rigid chamber (11); the loading of the bag magazine (8) with sample liquid (7); the purging of entrapped air from the bag magazine (8); and the dispensing of sample liquid (7). After the bag magazine (8) is inserted into the immersion coupler (2), the port (12) is sealed closed and the rigid chamber (11) is flooded, as shown in FIG. 3 (a). During flooding, hydraulic liquid (6) fills the rigid chamber (11) by positive displacement generated by the hydraulic pump (1). As hydraulic liquid (6) fills the chamber, entrapped air (18) escapes through the air vent (19). Flooding is complete when the rigid chamber (11) is completely filled with hydraulic liquid (6) and substantially all entrapped air (18) has been eliminated through the air vent (19). When flooding is complete, the air vent (19) is closed. Complete flooding and the elimination of substantially all entrapped air (18) from the rigid chamber (11), as shown in FIG. 3 (b), establishes hydraulic contact between the hydraulic pump (1) and the flexible bag structure (13) of the bag magazine (8).

Once hydraulic contact is established with the bag magazine (8), the bag magazine is loaded with sample liquid (7). By refluxing hydraulic liquid (6) from the rigid chamber (11), the flexible bag structure (13) will expand and will aspirate sample liquid (7) into its enclosure (20). The reflux of hydraulic liquid (6) and the aspiration of sample liquid (7) are illustrated in FIG. 3 (c).

After sample liquid (7) is aspirated into the enclosure (20) of the flexible bag structure (13), entrapped air (21) is purged from the enclosure (20). Purging substantially all of the entrapped air (21) establishes hydraulic contact between the hydraulic pump (1) and the sample liquid (7) contained within the enclosure (20) of the flexible bag structure (13). FIG. 3 (d) illustrates the purging of entrapped air (21) from the enclosure (20) of the flexible bag structure (13). The flexible bag structure (13) is collapsed by positive displacement of hydraulic liquid (6) generated by the hydraulic pump (1) and passing into the rigid chamber (11). Because entrapped air (21) rises to the topmost part of the enclosure (15) and because the tubular spout (14) is connected to the topmost part of the enclosure (15), entrapped air (21) expresses from the enclosure (20) through the tubular spout (14) as the flexible bag structure (13) collapses. In an alternative embodiment, the tubular spout (14) may be attached to the flexible bag structure (13) at locations other than the topmost part (15). For example, if the tubular spout (14) is attached to the bottom most part of the flexible bag structure (13), the user merely inverts the entire immersion coupler (2) in order to purge substantially all of the entrapped air (21) from the enclosure (20). The expression of entrapped air (21) will precede the expression of sample liquid (7). The expression of sample liquid (7) from the tubular spout (14) is a positive indication that the purging of entrapped air (21) from the enclosure (20) is substantially complete. Once substantially all of the entrapped air (21) has been eliminated from the enclosure (20), hydraulic contact is established between the hydraulic pump (1) and the sample liquid (7) contained within the bag magazine (8).

After hydraulic contact is established between the pump (1) and the sample liquid (7), the bag magazine (8) may be refilled by further aspiration of sample liquid (7) caused by further reflux of hydraulic liquid (6) back to the hydraulic pump (1). Refilling the bag magazine (8) is illustrated in FIG. 3 (e).

After the bag magazine (8) is filled with sample liquid (7) and hydraulic contact is established between the pump (1) and the sample liquid (7), the immersion coupler (2) can relay a quantitative positive hydraulic displacement from the hydraulic pump (1) to the bag magazine (8) and to the sample liquid (7) enclosed therein, for expressing and dispensing sample liquid (7) through the tubular spout (14) by quantitative positive hydraulic displacement. The immersion coupler (2) is shown dispensing sample liquid (7) by quantitative positive hydraulic displacement in FIG. 3 (f).

The diaphragmatic coupler (3) is shown in FIG. 4 in the open position; its corresponding insertable envelope magazine (9) is shown in FIG. 5; and the diaphragmatic coupler (3) is shown in the closed position with an envelope magazine (9) inserted therein FIG. 6. The diaphragmatic coupler (3) includes a rigid chamber (22) which encloses both a hydraulic compartment (23) and the insertable envelope magazine (9). The rigid chamber (22) includes a port (24) which may be opened to insert or remove the envelope magazine (9). FIG. 4 shows the port (24) in the open position for inserting the envelope magazine (9).

A diaphragm (25) partitions the rigid chamber to form the hydraulic compartment (23) for containing the hydraulic liquid (6). The diaphragm (25) is shown in FIG. 4 as a partial fragment in order to provide a view of the interior of the hydraulic compartment (23). The hydraulic compartment (23) encloses hydraulic liquid (6) and is hydraulically connected to the hydraulic pump (1). It is not necesary to reflux hydraulic liquid (6) from the rigid chamber (22) when changing the envelope magazine (9). It is a purpose of the hydraulic compartment (23) to contain the hydraulic liquid (6) and to eliminate the need to open the system of hydraulic liquid (6) to air when inserting the magazine.

The envelope magazine (9) is adapted for insertion into the diaphragmatic coupler (3). The envelope magazine (9) includes a tubular spout (26) and a flexible envelope structure (27) having a topmost part (28). The tubular spout (26) is connected to the topmost part (28) of the flexible envelope structure (27). The tubular spout (26) has a substantially constant carrying volume, as with the tubular spout (14) for the immersion coupler (2). To insert the envelope magazine (9) into the diaphragmatic coupler (3), the port (24) of the rigid chamber (22) is opened, the flexible envelope structure (27) is laid over the diaphragm (25), and the port (24) is closed over the envelope magazine (9). In the closed position, the port (24) prevents air from entering the rigid chamber (22). The shape of the envelope magazine (9) is configured to the shape of the diaphragm (25). The tubular spout (26) of the envelope magazine (9) passes through the exit (29) in the rigid chamber (22) of the diaphragmatic coupler (3). The passing of the tubular spout (26) of the envelope magazine (9) causes the exit (29) to be stoppered when the port (24) is closed so that air is prevented from entering the rigid chamber (22) of the diaphragmatic coupler (3).

In order to establish hydraulic contact between the hydraulic pump (1) and the flexible envelope, there must be an airless contact, or substantially airless contact, between the inserted envelope magazine (9) and the diaphragm (25). The detail of an airless contact is shown in FIG. 6. To achieve airless contact after the port (24) is closed, entrapped air is eliminated from the rigid chamber (22) and the interface between the diaphragm (25) and the flexible envelope structure (27) by the application of hydraulic pressure. Hydraulic pressure generated by the hydraulic pump (1) and applied to the hydraulic compartment (23) will force entrapped air from the rigid chamber (22).

The sequential procedure for preparing the diaphragmatic coupler (3) for use is illustrated as a series in FIG. 7 (a), (b), (c), (d), and (e). FIG. 7 (a) illustrates the envelope magazine (9) enclosed in the rigid chamber (22) with the port (24) closed and the rigid chamber (22) purged of entrapped air. Hydraulic contact is established between the hydraulic pump (1) and the flexible envelope structure (27) (supra).

Once hydraulic contact is established, the hydraulic pump (1) refluxes hydraulic liquid (6) in order to partially evacuate hydraulic liquid (6) from the hydraulic compartment (23). The reflux of the hydraulic liquid (6) causes the flexible envelope structure (27) to expand and to aspirate sample liquid (7) into the enclosure (30) of the envelope magazine (9). The reflux of hydraulic liquid (6) and the aspiration of sample liquid (7) are illustrated in FIG. 7 (b).

After sample liquid (7) is aspirated into the enclosure (30) of the flexible envelope structure, entrapped air (31) is purged from its enclosure (30). Purging substantially all of the entrapped air (31) establishes hydraulic contact between the hydraulic pump (1) and the sample liquid (7) contained within the enclosure (30) of the flexible envelope structure (27). FIG. 7 (c) illustrates the purging of the enclosure (30) of the flexible envelope structure (27). The flexible envelope structure (27) is collapsed by positive displacement of hydraulic liquid (6) generated by the hydraulic pump (1) and passing into the hydraulic compartment (23) within rigid chamber (22). Because entrapped air (31) rises to the topmost part of the enclosure (28) and because the tubular spout (26) is connected to the topmost part of the enclosure (28), entrapped air (31) expresses from the enclosure (30) through the tubular spout (26) as the flexible envelope structure (27) collapses. The expression of entrapped air (31) will precede the expression of sample liquid (7). The expression of sample liquid (7) from the tubular spout (26) is a positive indication that the purging of entrapped air (31) from the enclosure (30) is substantially complete. Once entrapped air (31) has been substantially eliminated from the enclosure (30), hydraulic contact is established between the hydraulic pump (1) and the sample liquid (7) contained within the envelope magazine (9).

After hydraulic contact is established between the pump (1) and the sample liquid (7), the envelope magazine (9) may be refilled by further aspiration caused by further reflux of hydraulic liquid (6) from the hydraulic compartment (23) back to the hydraulic pump (1). Refilling the envelope magazine (9) is illustrated in FIG. 7 (d).

After the envelope magazine (9) is filled with sample liquid (7) and hydraulic contact is established between the pump (1) and the sample liquid (7), the diaphragmatic coupler (3) can relay a quantitative positive hydraulic displacement from the hydraulic pump (1) to the envelope magazine (9) and to the sample liquid (7) enclosed therein for expressing sample liquid (7) and dispensing sample liquid (7) through the tubular spout (26) by quantitative positive hydraulic displacement. The diaphragmatic coupler (3) is shown dispensing sample liquid (7) by quantitative positive hydraulic displacement in FIG. 7 (e).

Figure 8:
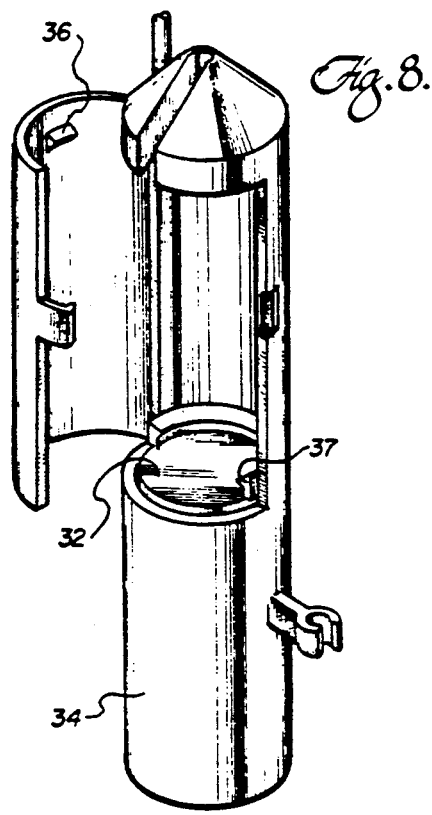
FIG. 8 is a view in perspective of the preferred embodiment of the mechanical coupler as illustrated in FIG. 1.
Figure 9:
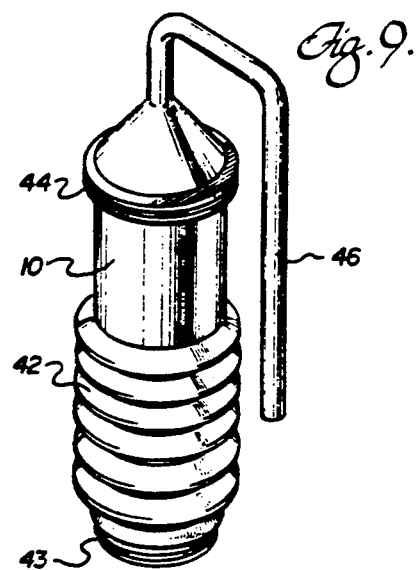
FIG. 9 is a veiw in perspective of the mechanical magazine as illustrated in FIG. 1.

A mechanical coupler (4) is shown in FIG. 8 and its corresponding insertable mechanical magazine (10) is shown in FIG. 9. The mechanical coupler (4) includes a coupler piston (32) and a coupler cylinder (33) within a housing (34). The coupler piston (32) is slidable within the coupler cylinder (33). The coupler piston (32) and coupler cylinder (33) define a chamber (35) which varies in size as the coupler piston (32) slides therein. The chamber (35) encloses hydraulic liquid (6) and is hydraulically connected to the hydraulic pump (1). The FIG. 8 shows the coupler housing (34) and the top of the coupler piston (32). Attached to the coupler housing (34) is a housing brace (36) and attached to the top of the coupler piston (32) is a piston brace (37). Both the housing brace (36) and the piston brace (37) hold the mechanical magazine (10) in position when it is inserted into the mechanical coupler (4).

The mechanical magazine (10) includes a magazine piston (38) and a magazine cylinder (39). The magazine piston (38) is slidable within the magazine cylinder (39). The magazine piston (38) and magazine cylinder (39) define an enclosure (40) which varies in volume as the magazine piston (38) slides therein. The magazine piston (38) can slide the entire length of the magazine cylinder (39) so as to reduce the volume of the enclosure (40) to nil. The enclosure (40) is configured so that the topmost part (41) is the last volume as the piston slides to reduce the volume to nil. The mechanical magazine (10) may also include a bellows (42) to shield the enclosure (40) against contamination.

Attached to the magazine piston (38) is a piston brace receptor (43) and attached to the magazine cylinder (39) is a cylinder brace receptor (44). When the mechanical magazine (10) is inserted into the mechanical coupler (4), the piston brace receptor (43) is held by the piston brace (37) and the cylinder brace receptor (44) is held by the housing brace (36). When the mechanical magazine (10) is inserted into the mechanical coupler (4) and the braces and receptors are connected, the magazine piston (38) and coupler piston (32) slide in concert within their respective cylinders while the magazine cylinder (39) and the coupler cylinder (33) are fixed in their relative positions with respect to the housing (34). When the mechanical magazine (10) is inserted and connected, hydraulic contact is established between the magazine piston (38) and the hydraulic pump (1).

The sequential procedure for preparing the mechanical coupler (4) for use is illustrated as a series in FIGS. 10 (a), (b), (c), (d), and (e). FIG. 10 (a) illustrates the attachment of the inserted mechanical magazine (10) within the mechanical coupler (4). The magazine piston (38) is held to the coupler piston (32) by the attachment of the piston brace (37) to the piston brace receptor (43). The piston attachment causes the magazine piston (38) and coupler piston (32) to slide identically and establishes hydraulic contact between the hydraulic pump (1) and the magazine piston (38). The magazine cylinder (39) is held in a fixed position relative to the coupler cylinder (33) by the attachement of the housing brace (36) to the cylinder brace receptor (44). The combination of the piston attachement and the cylinder attachment causes the volume of the enclosure (40) of the mechanical magazine (10) to vary proportionally to the volume of the chamber (35) of the mechanical coupler (4). Since the chamber (35) is hydraulically connected to the hydraulic pump (1), positive displacements of hydraulic liquid (6) cause expansion of the chamber (35) and the collapse of the magazine enclosure (40).

Once hydraulic contact is established, the hydraulic pump (1) refluxes hydraulic liquid (6) in order to partially evacuate hydraulic liquid (6) from the chamber (35) of the mechanical coupler (4). The reflux of the hydraulic liquid (6) causes the enclosure (40) of the mechanical magazine (10) to expand and to aspirate sample liquid (7) into the enclosure (40). The reflux of hydraulic liquid (6) and the aspiration of sample liquid (7) are illustrated in FIG. 10 (b).

After sample liquid (7) is aspirated into the enclosure (40) of the mechanical magazine (10), entrapped air (45) is purged from its enclosure (40). Purging substantially all of the entrapped air (45) establishes hydraulic contact between the hydraulic pump (1) and the sample liquid (7) contained within the enclosure (40) of the mechanical magazine (10). FIG. 10 (c) illustrates the purging of entrapped air (45) from the enclosure (40) of the mechanical magazine (10). The enclosure (40) of the mechanical magazine (10) is collapsed by positive displacement of hydraulic liquid (6) generated by the hydraulic pump (1) and passing into the chamber (35) of the mechanical coupler (4). Because entrapped air (45) rises to the topmost part of the enclosure (41) and because the tubular spout (46) is connected to the topmost part of the enclosure (41), entrapped air (45) expresses from the enclosure (40) through the tubular spout (46) as the enclosure (40) of the mechanical magazine (10) collapses. The expresssion of entrapped air (45) will precede the expression of sample liquid (7). Because the tubular spout (46) has a substantially constant carrying volume, the expression of sample liquid (7) from the tubular spout (46) is a positive indication that the purging of entrapped air (45) from the enclosure (40) is substantially complete. Once substantially all of the entrapped air (45) has been eliminated from the enclosure (40), hydraulic contact is established between the hydraulic pump (1) and the same liquid (7) contained within the mechanical magazine (10).

Figures 10A, 10B, 10C, 10D, 10E:
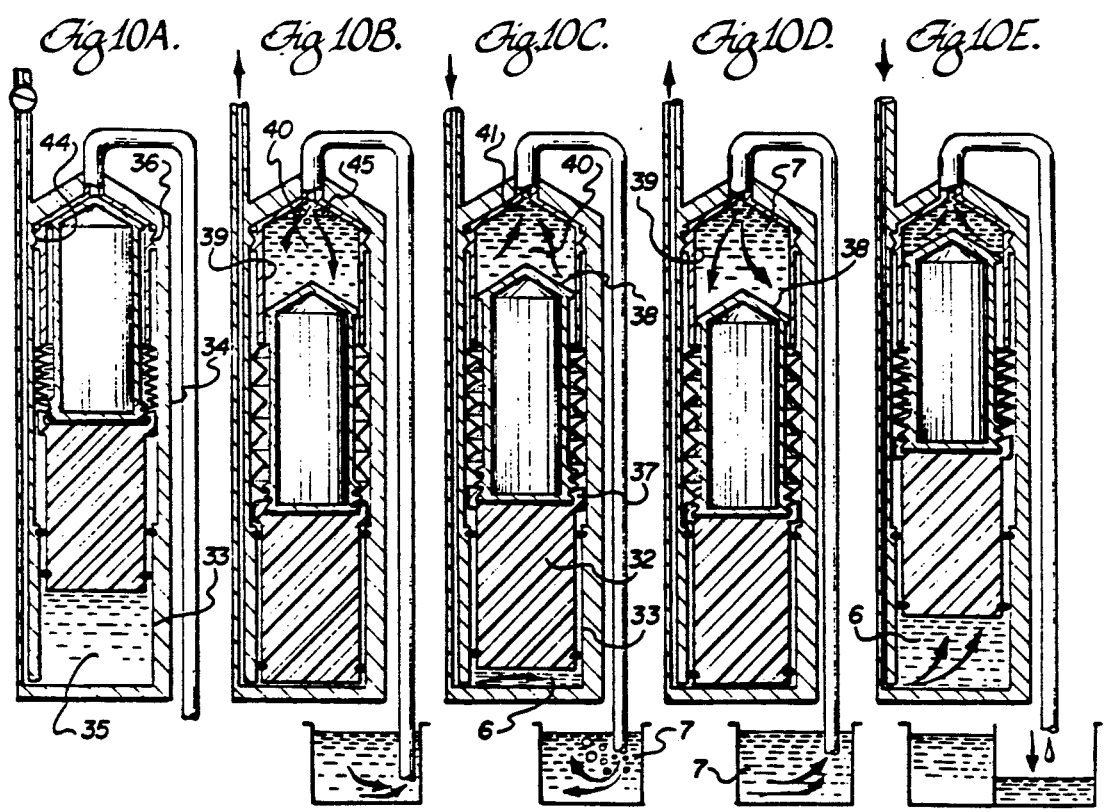
FIGS. 10 (a), (b), (c), (d), and (e) are each sectional views of the mechanical coupler illustrated in FIG. 8 and with the mechanical magazine illustrated in FIG. 9 inserted therein and showing the sequence for using the hydraulic dispenser.

After hydraulic contact is established between the pump (1) and the sample liquid (7), the mechanical magazine (10) may be refilled by further aspiration caused by further reflux of hydraulic liquid (6) from the chamber (35) of the mechanical coupler (4) back to the hydraulic pump (1). Refilling the mechanical magazine (10) is illustrated in FIG. 10(d).

After the enclosure (40) of the mechanical magazine (10) is filled with sample liquid (7) and hydraulic contact is established between the pump (1) and the sample liquid (7), the mechanical coupler (4) can relay a quantitative positive hydraulic displacement from the hydraulic pump (1) to the magazine piston (38) and to the sample liquid (7) enclosed within the enclosure (40) of the mechanical magazine (10) for expressing sample liquid (7) and dispensing sample liquid (7) through the tubular spout (46) by quantitative positive hydraulic displacement. The mechanical coupler (4) is shown dispensing sample liquid (7) by quantitative positive hydraulic displacement in FIG. 10(e).

I claim:

1. A hydraulic dispenser for aspirating and expressing a sample liquid using a hydraulic liquid, the hydraulic dispenser of the type which employs a magazine for containing the sample liquid, the magazine including a collapsible enclosure and a tubular spout, the collapsible enclosure for holding the sample liquid, the tubular spout connected to and communicating with the collapsible enclosure, the tubular spout having a substantially constant carrying volume for guiding the sample liquid to and from the collapsible enclosure, the hydraulic dispenser comprising:

a hydraulic pump for generating a quantitative positive displacement of the hydraulic liquid and for generating a reflux displacement of the hydraulic liquid, a hydraulic hose, a magazine coupler, and a handle portion incorporated onto said magazine coupler for manually supporting and directing said magazine coupler, said hose connected to both said hydraulic pump and to said magazine coupler for hydraulically coupling said hydraulic pump to said magazine coupler and for imparting said magazine coupler with freedom of movement, said magazine coupler being capable of coupling to the magazine for transmitting the quantitative positive displacement and the reflux displacement of hydraulic liquid from said hydraulic pump to the sample liquid within the magazine for expressing and aspirating sample liquid within the tubular spout, whereby sample liquid can be quantitatively expressed from the tubular spout of the magazine and can be aspirated into the tubular spout of said magazine by attaching the magazine to said magazine coupler and activating said hydraulic pump and can be manually directed while being dispensed from the tubular spout by grasping and directing said handle portion.

2. A hydraulic dispenser as claimed in claim 1 wherein the magazine is a bag magazine and wherein:
said magazine coupler is an immersion coupler.

3. A hydraulic dispenser as claimed in claim 1 wherein the magazine is an envelope magazine and wherein:
said magazine coupler is a diaphragmatic coupler.

4. A hydraulic dispenser as claimed in claim 1 wherein said magazine is a mechanical magazine and wherein:
said magazine coupler is a mechanical coupler.

5. An insertable and purgable bag magazine for inserting into and coupling to a hand held hydraulic dispenser having a manually supported immersion coupler with a rigid chamber, the bag magazine for receiving, containing, and releasing a sample liquid to be dispensed by the hand held hydraulic dispenser, the bag magazine for automatically eliminating substantially all entrapped air contained therein the bag magazine comprising:

a flexible bag structure defining an enclosure for holding the sample liquid and adapted to be coupled to the manually supported immersion coupler by means of confinement within the rigid chamber, the enclosure having a topmost part, said flexible bag structure defining an orifice communicating with the topmost part of the enclosure, the enclosure being configured for the sample liquid to be contained by the topmost part only when the enclosure is completely filled with the sample liquid, said flexible bag structure being both expandable and collapsible for expanding and collapsing the enclosure, said flexible bag structure having means for coupling to the hydraulic dispenser for expanding and collapsing said flexible bag structure and a tubular spout attached to said flexible bag structure at the orifice for receiving air expressed from the topmost part of the enclosure, said tubular spout being rigid or semi-rigid and extending downwardly from said flexible bag structure, said tubular spout adapted to extend and terminate proximally below the hand held hydraulic dispenser when the bag magazine is installed therein, said rigid or semi-rigid tubular spout providing control to the user when manually aspirating and expressing sample liquid to and from said flexible bag structure, said tubular spout defining a hollow guide for guiding the sample liquid to and from the enclosure via the orifice, the hollow guide having a substantially constant carrying volume, the hollow guide having a cross dimension and said tubular spout having surface properties for holding the sample liquid across the cross dimension by sample liquid surface tension sufficient to overcome the flotation of entrapped air within the guide, whereby manually orienting the hydraulic dispenser in the upright position and collapsing the enclosure will cause substantially all entrapped air to vent from the enclosure prior to the expression of sample liquid therefrom.

6. An insertable and purgable mechanical magazine for inserting into and coupling to a hand held hydraulic dispenser having a manually supported mechanical coupler with a coupler piston and a coupler cylinder, the mechanical magazine for receiving, containing, and providing a sample liquid to be dispensed by the hand held hydraulic dispenser, the mechanical magazine for automatically eliminating substantially all entrapped air contained therein, the mechanical magazine comprising:

a container structure having a magazine piston and a magazine cylinder defining an enclosure for holding the sample liquid and adapted to be coupled to the manually supported mechanical coupler, the enclosure having a topmost part, the magazine cylinder defining an orifice communicating with the topmost part of the enclosure, the enclosure being configured for the sample liquid to be contained by the topmost part only when the enclosure is completely filled with the sample liquid, the magazine piston slidable within the magazine cylinder for expanding and collapsing the enclosure, the container structure having means for coupling to the hydraulic dispenser for expanding and collapsing the container structure and a tubular spout attached to the magazine cylinder at the orifice for receiving air expressed from the topmost part of the enclosure, said tubular spout being rigid or semi-rigid and extending downwardly from said container structure, said tubular spout adapted to extend and terminate proximally below the hand held hydraulic dispenser when the mechanical magazine is installed therein, said rigid or semi-rigid tubular spout providing control to the user when manually aspirating and expressing sample liquid to and from said container, said tubular spout defining a hollow guide for guiding the sample liquid to and from the enclosure via the orifice, the hollow guide having a substantially constant carrying volume, the hollow guide having a cross dimension and the spout having surface properties for holding the sample liquid across the cross dimension by sample liquid surface tension sufficient to overcome the floatation of entrapped air within the guide, whereby manually orienting the hydraulic dispenser in the upright position and sliding the magazine piston and collapsing the enclosure will cause substantially all entrapped air to vent from the enclosure prior to the expression of sample liquid therefrom.

7. A hand held method for hydraulically aspirating and expressing sample liquid from an insertable magazine and purging air therefrom using a hydraulic press, the method comprising:

Step A: hydraulically coupling the magazine to a hand supportable portion of the hydraulic press so as to couple the aspiration and expression of sample liquid to and from the magazine and the purging of air from the magazine with the activation of the hydraulic press; then Step B: aspirating sample liquid into the magazine by activating the hydraulic press so as to generate a reflux displacement of hydraulic liquid, then Step C: purging air from the magazine by activating the hydraulic press so as to generate a positive displacement of hydraulic liquid, then Step D: manually supporting the hand supportable portion of the hydraulic press for directing the expression of sample liquid while simultaneously;

Step E: quantitatively expressing sample liquid from the magazine by activating the hydraulic press so as to generate a quantitative positive displacement of hydraulic liquid.

* * * * *